(12) United States Patent
Hiratsuka et al.

(10) Patent No.: US 9,274,387 B2
(45) Date of Patent: Mar. 1, 2016

(54) LIQUID CRYSTAL DISPLAY DEVICE

(71) Applicant: Japan Display Inc., Tokyo (JP)

(72) Inventors: Takato Hiratsuka, Tokyo (JP); Osamu Itou, Tokyo (JP); Daisuke Sonoda, Tokyo (JP); Toshimasa Ishigaki, Tokyo (JP)

(73) Assignee: Japan Display Inc., Tokyo (JP)

(*) Notice: Subject to any disclaimer, the term of this patent is extended or adjusted under 35 U.S.C. 154(b) by 33 days.

(21) Appl. No.: 14/222,749

(22) Filed: Mar. 24, 2014

(65) Prior Publication Data

US 2014/0320795 A1    Oct. 30, 2014

(30) Foreign Application Priority Data

Apr. 25, 2013  (JP) .................. 2013-092512

(51) Int. Cl.
*G02F 1/1343* (2006.01)
*G02F 1/1339* (2006.01)
*G02F 1/1333* (2006.01)

(52) U.S. Cl.
CPC .... *G02F 1/134363* (2013.01); *G02F 1/133377* (2013.01); *G02F 1/13394* (2013.01)

(58) Field of Classification Search
CPC combination set(s) only.
See application file for complete search history.

(56) References Cited

U.S. PATENT DOCUMENTS

2010/0302492 A1* 12/2010 Kubota et al. ................. 349/138
2012/0257156 A1   10/2012 Hiratsuka et al.

FOREIGN PATENT DOCUMENTS

JP    2000-352713    12/2000
JP    2012-220575    11/2012

* cited by examiner

*Primary Examiner* — Wen-Ying P Chen
(74) *Attorney, Agent, or Firm* — Typha IP LLC

(57) ABSTRACT

Pixel electrodes each include a pixel plane portion expanded along a surface of the substrate, and a pixel wall portion rising up from the pixel plane portion. Common electrodes each include a common plane portion expanded along a surface of the substrate, and a common wall portion rising up from the common plane portion so as to face the pixel wall portion. Each of the compartment areas has the pixel wall portion on one of right and left sides in the lateral direction, and has the common wall portion on the other of the right and left sides. Molecules of the liquid crystal material are tilted up from the pixel wall portions in a direction of the common wall portion by the electric field. The respective pixel wall portions of the adjacent compartment areas are positioned on opposite sides to each other in the lateral direction.

9 Claims, 16 Drawing Sheets

LIQUID CRYSTAL DISPLAY DEVICE

CROSS-REFERENCE TO RELATED APPLICATION

The present application claims priority from Japanese application JP2013-92512 filed on Apr. 25, 2013, the content of which is hereby incorporated by reference into this application.

BACKGROUND OF THE INVENTION

1. Field of the Invention

The present invention relates to a liquid crystal display device.

2. Description of the Related Art

In a horizontal electric field system (JP 2000-352713 A) which is an example of a display system of the liquid crystal display device, for the purpose of allowing a direction of a molecular axis of oriented liquid crystal molecules to rotate in a plane substantially parallel to substrates, a common electrode and pixel electrodes are disposed on one substrate, respective voltages are applied to the common electrode and the pixel electrodes, and electric field components substantially parallel to the substrates are used for display. The liquid crystal display device of the horizontal electric field system has advantages that a wide viewing angle can be obtained, and an image contrast can be improved.

In the related art liquid crystal display device of the horizontal electric field system, the horizontal electric field is generated between adjacent comb electrodes. Therefore, because a horizontal component of the electric field is small on the comb electrodes, a liquid crystal material cannot be sufficiently rotated.

FIG. 23 of JP 2012-220575 A discloses a configuration in which wall electrodes are arranged on both ends of one pixel. The respective wall electrodes are formed on both ends of one pixel, and one of the wall electrodes is each pixel electrode, and the other wall electrode is a common electrode. Also, a plane electrode is disposed for blocking an influence (signal wiring potential and a potential of an adjacent pixel) of a peripheral potential of the pixel.

As a result of evaluating the characteristic of the liquid crystal display device, it is found that an equipotential surface within one pixel is left-right asymmetric from a center of the pixel, and an orientation state of liquid crystal is also left-right asymmetric. The reason is because since the pixel electrode is surrounded by an influence of a potential around the pixel electrode, the equipotential surface is formed centered on each pixel electrode, and an electric field distribution in the vicinity of the pixel electrodes and an electric field distribution in the vicinity of the common electrode are different from each other. Also, an electric force line distribution is dense in the vicinity of the pixel electrodes and coarse in the vicinity of the common electrode, and an intense vertical electric field is generated on the plane electrode in the vicinity of the pixel electrode. For that reason, liquid crystal in the vicinity of each pixel electrode is tilted up, and the orientation state of liquid crystal is left-right asymmetric in the vicinity of the pixel electrode and the common electrode. A transmittance in a direction along which the liquid crystal in the vicinity of the pixel electrode rises up, that is, when obliquely viewing a display is lowered to degrade a viewing angle characteristic. In particular, the lowering of the transmittance is remarkable in a halftone.

SUMMARY OF THE INVENTION

An object of the invention is to provide a liquid crystal material with an effective electric field distribution generated by a horizontal electric field so that a viewing angle characteristic is not degraded.

(1) According to the invention, there is provided a liquid crystal display device including a substrate having a plurality of compartment areas, a plurality of pixel electrodes disposed in the plurality of partition areas of the substrate, a plurality of common electrodes disposed in the plurality of partition areas of the substrate, and a liquid crystal material driven by an electric field generated between the plurality of pixel electrodes and the plurality of common electrodes, in which the plurality of pixel electrodes each includes a pixel plane portion expanded along a surface of the substrate, and a pixel wall portion rising up from the pixel plane portion, and one of the pixel electrodes is arranged in each of the partition areas, in which the plurality of common electrodes each includes a common plane portion expanded along a surface of the substrate, and a common wall portion rising up from the common plane portion so as to face the pixel wall portion, and one of the common electrodes is arranged in each of the partition areas, in which the plurality of compartment areas is arrayed in a lateral direction and a longitudinal direction of the surface of the substrate, in which each of the compartment areas has the pixel wall portion on one of right and left sides in the lateral direction, and has the common wall portion on the other of the right and left sides in the lateral direction, in which molecules of the liquid crystal material are tilted up from the pixel wall portions in a direction of the common wall portion by the electric field, and in which the respective pixel wall portions of the adjacent compartment areas are positioned on opposite sides to each other in the lateral direction. According to the invention, a horizontal electric field is generated between the pixel wall portions and the common wall portions which face each other. However, the molecules of the liquid crystal material are tilted up with the provision of the pixel plane portion. Then, the transmittance is different according to a direction viewed obliquely. Under the circumstances, the sides where the pixel wall portions are located are reversed right and left between the adjacent compartment areas so that the tilted up side is reversed, and the compartment areas higher in the transmittance are arranged adjacent to the compartment areas lower in the transmittance. With this configuration, the effective electric field distribution caused by the horizontal electric field can be given the liquid crystal material so that the viewing angle characteristic is not degraded.

(2) In the liquid crystal display device according to the item (1), a distance X from an edge of the pixel plane portion on a side where the pixel wall portion is disposed to a center of the compartment area, a pixel width p from the pixel wall portion in a direction of the common wall portion, and a length L extending from the edge of the pixel plane portion toward the common wall portion have a relationship of following Expression (1).

$$X - p \times (0.05) \leq L \leq X + p \times (0.25) \quad (1)$$

(3) In the liquid crystal display device according to the item (1) or (2), the common plane portion extends from the common wall portion so as to reach under the overall pixel plane portion through an insulating film.

(4) In the liquid crystal display device according to the item (1) or (2), the common plane portion extends from the common wall portion so as not to overlap with the pixel plane portion.

(5) In the liquid crystal display device according to the item (4), the plurality of common electrodes each further include a second common plane portion that is electrically connected to the common plane portion, and positioned under the overall pixel plane portion through an insulating film.

(6) In the liquid crystal display device according to any one of the items (1) to (5), a facing direction of the pixel wall portion and the common wall portion which face each other is parallel to the lateral direction, and the molecules of the liquid crystal material are oriented so that a long axis direction of the molecules is oblique to the longitudinal direction, and non-parallel to the lateral direction.

(7) In the liquid crystal display device according to any one of the items (1) to (5), a pixel area is configured by a pair of the compartment areas aligned in the longitudinal direction, in one of the pair of compartment areas configuring the pixel area, the facing direction of the pixel wall portion and the common wall portion which face each other is inclined in a first rotating direction with respect to the lateral direction, in the other of the pair of compartment areas configuring the pixel area, the facing direction of the pixel wall portion and the common wall portion which face each other is inclined in a second rotating direction opposite to the first rotating direction with respect to the lateral direction, and the molecules of the liquid crystal material are oriented so that a long axis direction of the molecules is parallel to the longitudinal direction.

(8) In the liquid crystal display device according to the item (7), the plurality of pixel electrodes is arrayed so that wall surfaces of the pixel wall portions are extended to zigzag in the longitudinal direction, and the plurality of common electrodes is arrayed so that wall surfaces of the common wall portions are extended to zigzag in the longitudinal direction.

DETAILED DESCRIPTION OF THE INVENTION

Hereinafter, embodiments of the invention will be described with reference to the accompanying drawings.

First Embodiment

Figure 1:
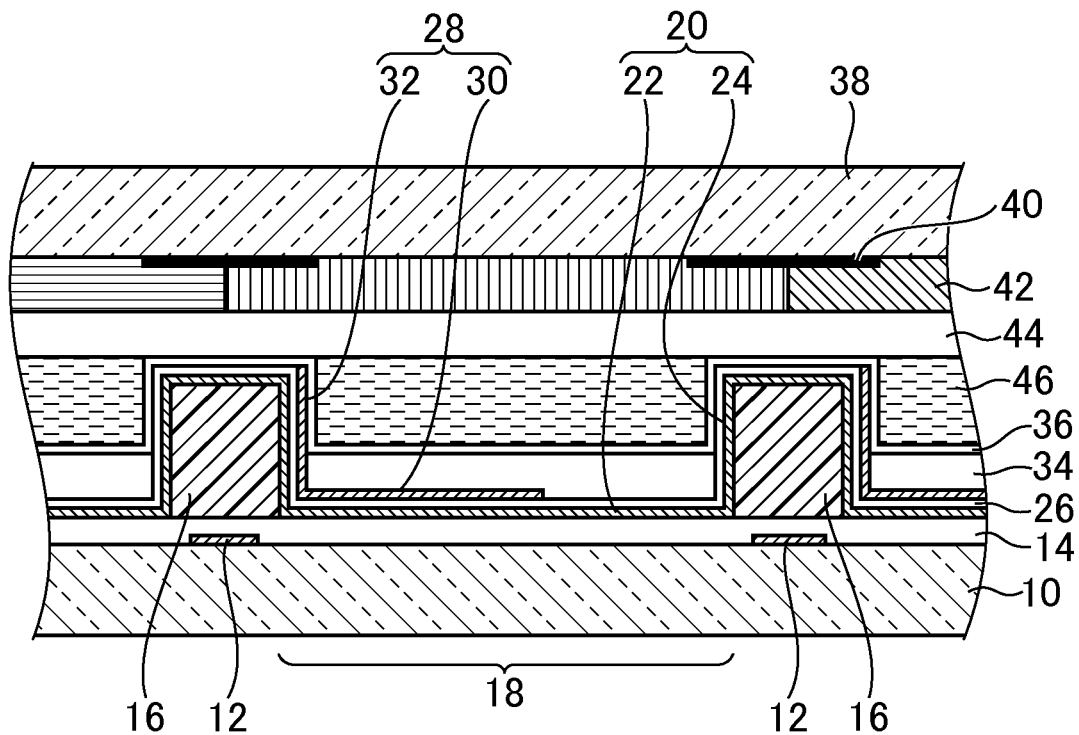
FIG. 1 is a cross-sectional view illustrating a liquid crystal display device according to a first embodiment of the invention.

FIG. 1 is a cross-sectional view illustrating a liquid crystal display device according to a first embodiment of the invention.

The liquid crystal display device includes a substrate 10. The substrate 10 has signal lines 12. The signal lines 12 are covered with a first interlayer insulating film 14. Walls 16 made of resin are formed on the first interlayer insulating film 14. The walls 16 are arranged above the signal lines 12, and each have a rising-up wall surface, and an upper end surface. The wall surfaces may rise up vertically from the substrate 10, or may rise up obliquely from the substrate 10. The substrate 10 is compartmented into a plurality of compartment areas 18 by the walls 16. An area between a pair of walls 16 is one compartment area 18.

Figure 2:
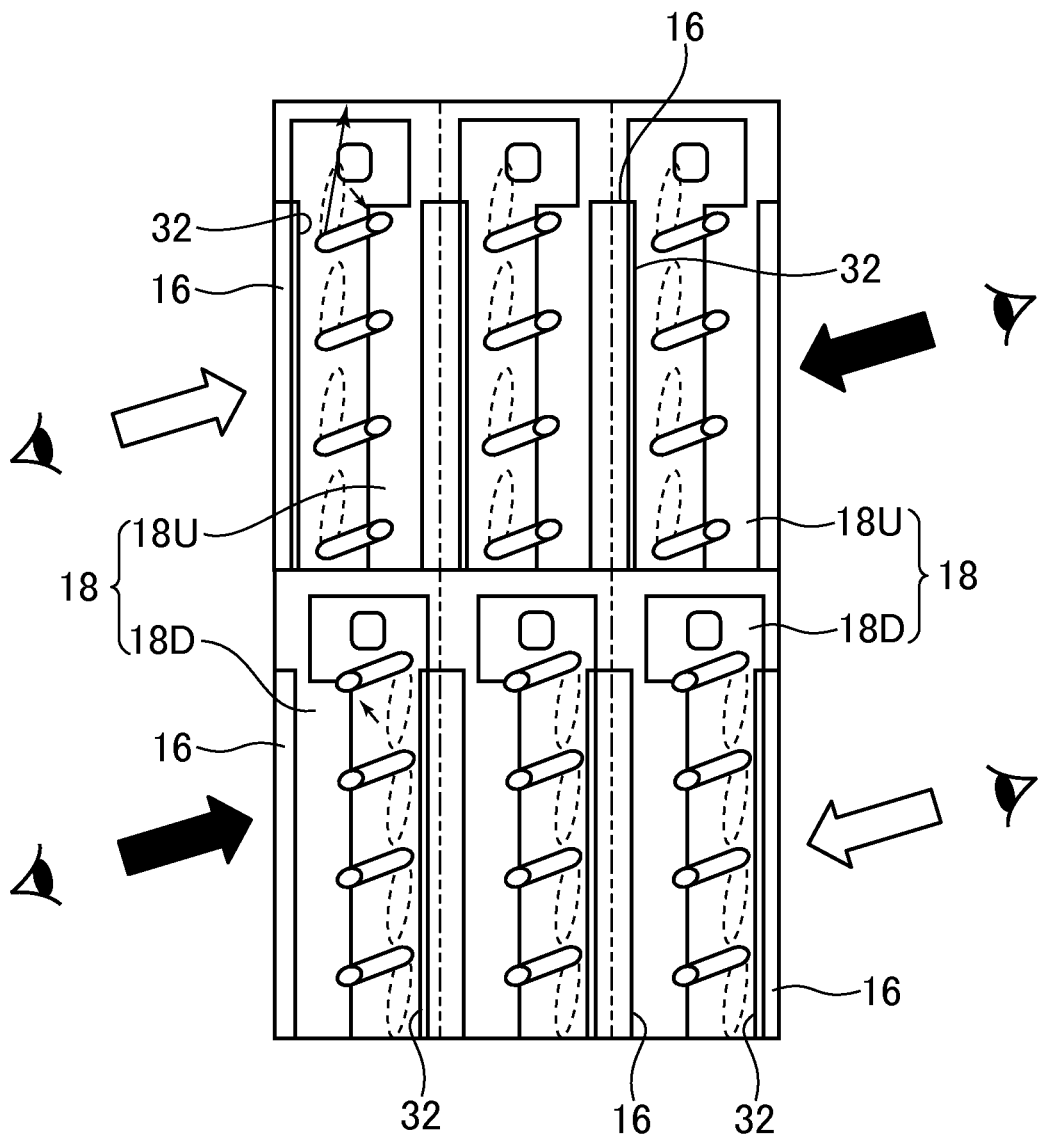
FIG. 2 is a plan view of a plurality of compartment areas.
Figure 2:
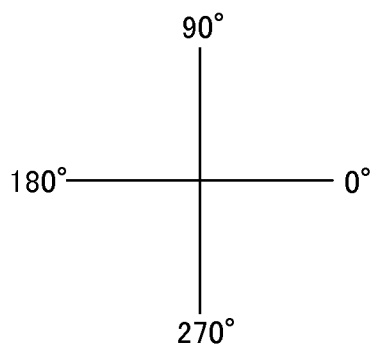

FIG. 2 is a plan view illustrating the plurality of compartment areas 18. The plurality of compartment areas 18 is arrayed on a surface of the substrate 10 in a lateral direction and a longitudinal direction thereof. The lateral direction and the longitudinal direction intersection with (for example, is orthogonal to) each other.

As illustrated in FIG. 1, the liquid crystal display device has a plurality of common electrodes 20 disposed in the respective compartment areas 18 of the substrate 10. One common electrode 20 is arranged in each of the compartment areas 18. The plurality of common electrodes 20 each has a common plane portion 22 expanded along the surface of the substrate 10. The common plane portions 22 are formed on the first interlayer insulating film 14. The plurality of common electrodes 20 each has a common wall portion 24 rising up from the common plane portion 22. The common wall portions 24 are formed on wall surfaces of the respective walls 16. The common electrodes 20 in the respective adjacent compartment areas 18 are connected to each other on the upper end surface of each wall 16. In the example of FIG. 1, the plurality of common electrodes 20 is connected integrally with each other. The common electrodes 20 are covered with a second interlayer insulating film 26. The common electrodes 20 each also have a function of suppressing an influence of pixel peripheral potentials such as potentials of the signal lines 12 or potentials of the adjacent pixels.

A plurality of pixel electrodes 28 is formed on the second interlayer insulating film 26. The plurality of pixel electrodes 28 is disposed in the respective compartment areas 18 of the substrate 10. One pixel electrode 28 is disposed in each of the compartment areas 18. The plurality of pixel electrodes 28 each has a pixel plane portion 30 expanded along the surface of the substrate 10. The common plane portions 22 are expanded under the overall pixel plane portions 30 through the second interlayer insulating film 26. The plurality of pixel electrodes 28 each have a pixel wall portion 32 rising up from the pixel plane portions 30. The pixel wall portions 32 are formed on the wall surfaces of the respective walls 16. The pixel wall portions 32 overlap with the respective common wall portions 24 through the second interlayer insulating film 26.

As illustrated in FIG. 1, each of the compartment areas 18 has one pixel wall portion 32 on one of right and left sides thereof in the lateral direction, and has one common wall portion 24 not overlapping with the pixel electrode 28 on the other of the right and left sides thereof in the lateral direction. The common wall portions 24 face the respective pixel wall portions 32. A facing direction of the pixel wall portions 32 and the common wall portions 24 which face each other is parallel to the lateral direction.

The common electrodes 20 are each formed over the surface of the wall 16 and an overall area between the adjacent walls 16, and the respective pixel electrodes 28 are arranged over the common electrodes 20 through the second interlayer insulating film 26. It is desirable that a retentive capacity is disposed for the purpose of stably operating a thin film transistor not shown. The retentive capacity may be formed by overlapping the pixel wall portions 32 and the common wall portions 24 with each other, or may be formed by overlapping the pixel plane portions 30 and the common plane portions 22 with each other. If the pixel wall portions 32 and the common wall portions 24 overlap with each other, and the pixel plane portions 30 and the common plane portions 22 overlap with each other, a sufficient area of the retentive capacity can be provided, and the thin film transistor can be stably operated.

The pixel plane portions 30 are each covered with an insulating layers 34. Each of the insulating layers 34 also covers a lower portion of the pixel wall portion 32. An oriented film 36 is formed to cover the walls 16 and the layers formed on the walls 16.

The liquid crystal display device has a color filter substrate 38 so as to face the above-mentioned substrate 10. The color filter substrate 38 includes black matrixes 40, color filter layers 42, and an overcoat layer 44 covering those components. The color filter substrate 38 is arranged so that the overcoat layer 44 faces (contacts) the oriented film 36 on the upper end surface of the walls 16. A space is formed between the oriented film 36 and the overcoat layer 44 in an area between the respective adjacent walls 16.

The liquid crystal display device has a liquid crystal material 46. The liquid crystal material 46 is arranged in spaces between the oriented film 36 and the overcoat layer 44. Molecules of the liquid crystal material 46 are oriented so that a long axis direction of the molecules is oblique to the longitudinal direction, and nonparallel to the lateral direction as illustrated by dashed lines in FIG. 2. The liquid crystal material 46 is driven by an electric field generated between the plurality of pixel electrodes 28 and the plurality of common electrodes 20. Because a uniform lateral electric field is generated between the pixel wall portions 32 and the common wall portions 24, the molecules of the liquid crystal material 46 within each pixel evenly migrate, and the transmittance of the overall pixel is increased.

In this embodiment, it is found that brightness when a screen is viewed from a front surface is high, but the brightness when the screen is viewed from a certain direction (direction of black arrows in FIG. 2) is low, and the viewing angle characteristic is degraded. In order to prove this cause, the orientation state of the liquid crystal material 46 has been studied through simulation.

Figure 3:
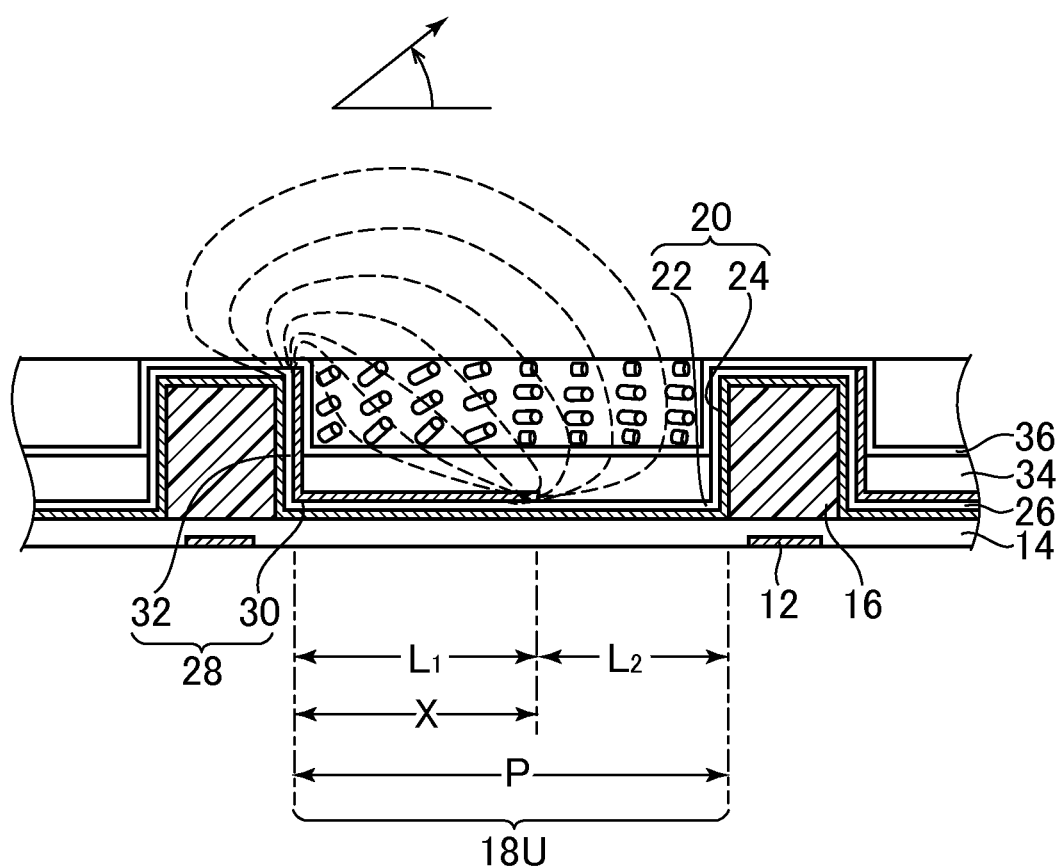
FIG. 3 is a diagram illustrating an equipotential surface distribution calculated through simulation in a structure illustrated in FIG. 1.

FIG. 3 is a diagram illustrating an equipotential surface distribution calculated through simulation in a structure illustrated in FIG. 1. As calculation conditions of the simulation, it is assumed that adjacent pixels are black display pixels (0V is applied to the pixel electrodes 28 and the common electrodes 20), and a length L1 of the pixel plane portions 30 of the pixel electrodes 28 is set to the same length (L1=L2) as a length L2 of the common plane portions 22 of the common electrodes 20. As a result, it is found that the equipotential surface within each pixel is asymmetric with respect to a center of the pixel, and the orientation of the molecules of the liquid crystal material 46 is also asymmetric. Specifically, the molecules of the liquid crystal material 46 are tilted up from the pixel wall portions 32 in the direction of the common wall portions 24 by the electric field.

The reason that the equipotential surface distribution is asymmetric is because potentials around the pixel electrodes 28, that is, potentials of the adjacent pixels, and a potential of an area far distant from the liquid crystal material 46 along a vertical line of the substrate 10 become about 0V. In this case, because a periphery of the pixel electrode 28 of each white display pixel is surrounded by a potential of 0V, and the equipotential surface is formed centered on the pixel electrodes 28, a difference is generated in the equipotential surface distribution between the pixel electrodes 28 side and the common electrodes 20 side. Also, as understood from an interval of the equipotential surfaces, a vertical electric field higher than that generated above the common plane portions 22 of the common electrodes 20 is generated above the pixel plane portions 30 of the pixel electrodes 28.

For that reason, the liquid crystal molecules in the vicinity of the pixel electrodes 28 are tilted up more than the liquid crystal molecules in the vicinity of the common electrodes 20. A sufficient phase difference is not obtained from a side on which the liquid crystal molecules are tilted up, and the brightness is lowered. Conversely, because the phase difference becomes large from an opposite side thereof, the brightness becomes higher. From the above fact, the viewing angle characteristic when the screen is obliquely viewed is degraded.

Figure 4:
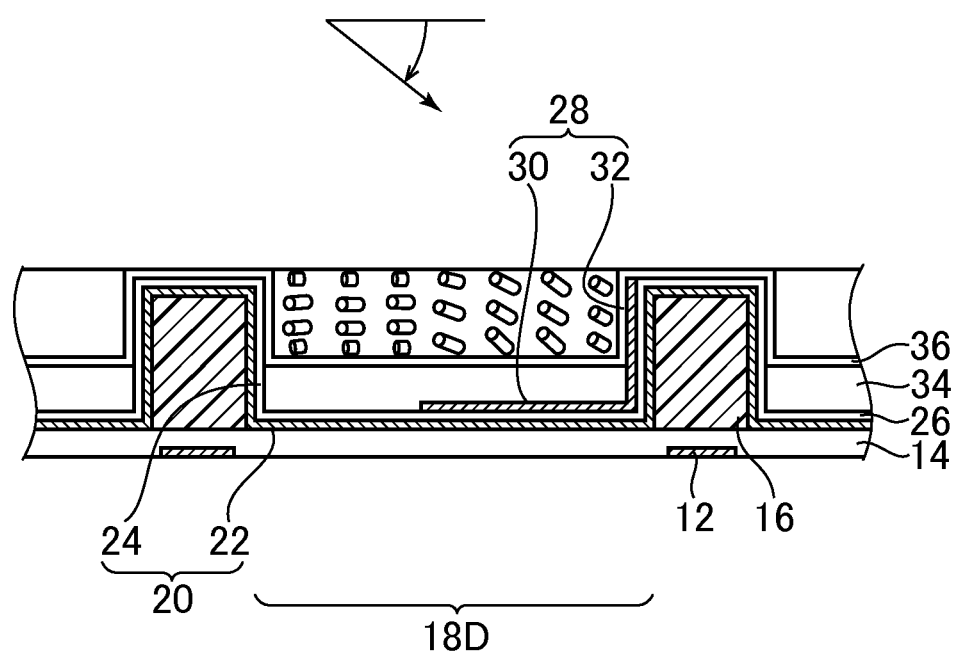
FIG. 4 is a cross-sectional view illustrating a compartment area adjacent to the compartment area illustrated in FIG. 3 in a longitudinal direction.

Under the circumstances, in this embodiment, as illustrated in FIG. 2, in adjacent compartment areas 18U and 18D, sides where the pixel wall portions 32 are located are reversed right and left. In the compartment area 18U illustrated on an upper side of FIG. 2, the pixel wall portions 32 are arranged on the left side. FIG. 3 illustrates a cross-section of the compartment area 18U. On the contrary, in the compartment area 18D illustrated on a lower side of FIG. 2, the pixel wall portions 32 are arranged on the right side. FIG. 4 is a cross-sectional view illustrating the compartment area 18D shown in the lower side of FIG. 2.

As illustrated in FIG. 2, initial orientations of the liquid crystal molecules are parallel to each other in any compartment areas 18. Also, a long axis of the liquid crystal molecules is slightly inclined with respect to a direction (longitudinal direction in FIG. 2) orthogonal to the electric field direction (lateral direction in FIG. 2). For that reason, the liquid crystal molecules that have received the electric field rotate in a direction along which an inclination of the long axis is increased. That is, in the compartment areas 18U illustrated in the upper side of FIG. 2, the liquid crystal molecules are twisted rightward from the initial orientation. In the compartment areas 18D illustrated in the lower side of FIG. 2, the liquid crystal molecules are twisted leftward from the initial orientation.

In this embodiment, the liquid crystal molecules are tilted up in any compartment area 18. The details have been described above with reference to FIG. 3. The compartment areas 18U in the upper side and the compartment areas 18D in the lower side of FIG. 2 are different in a direction of tilt-up from each other. In detail, the liquid crystal molecules in the compartment areas 18U in the upper side of FIG. 2 are tilted up in an upper right direction as illustrated in FIG. 3. For that reason, as illustrated in FIG. 2, when the screen is viewed from the tilted up side (right side), the phase difference becomes smaller, and the brightness becomes lower. When the screen is viewed from an opposite side (left side) thereof, the phase difference becomes larger, and the brightness becomes higher.

On the contrary, the liquid crystal molecules in the compartment areas 18U on the lower side of FIG. 2 are tilted up in the opposite direction. That is, as illustrated in FIG. 4 which is a cross-sectional view of the compartment areas 18U on the lower side of FIG. 2, the liquid crystal molecules are tilted up negatively in a right direction. Therefore, as illustrated in FIG. 2, when the screen is viewed from a side (right side) tilted up negatively, the phase difference becomes larger, and the brightness becomes higher. When the screen is viewed from the opposite side (left side), the phase difference becomes smaller, and the brightness becomes lower.

From the above viewpoint, the sides at which the pixel wall portions 32 are located are reversed right and left between the adjacent compartment areas 18U and 18D, as a result of which a direction along which the phase difference becomes smaller and a direction along which the phase difference becomes larger are compensated to suppress the lowering of the brightness, and the viewing angle characteristic is improved.

According to this embodiment, a horizontal electric field is generated between the pixel wall portions 32 and the common wall portions 24 which face each other. However, the molecules of the liquid crystal material 46 are tilted up with the provision of the pixel plane portions 30. Then, the transmittance is different according to a direction viewed obliquely. Under the circumstances, the sides where the pixel wall portions 32 are located are reversed right and left between the adjacent compartment areas 18U and 18D so that the tilted up side is reversed, and the compartment areas 18 higher in the transmittance are arranged adjacent to the compartment areas 18 lower in the transmittance. With this configuration, the effective electric field distribution caused by the horizontal electric field can be given the liquid crystal material 46 so that the viewing angle characteristic is not degraded.

In the example of FIG. 2, the compartment areas 18 each have a long shape, and the adjacent compartment areas 18U and 18D in which the positions of the pixel wall portions 32 are reversed right and left are aligned in a longitudinal direction thereof. That is, the positions of the pixel wall portions 32 are reversed right and left between the compartment areas 18U and 18D adjacent to each other in the longitudinal direction. Also, the positions of the pixel wall portions 32 are at the same side in the compartment areas 18 adjacent to each other in the lateral direction. As a modified example, the adjacent compartment areas 18 in which the positions of the pixel wall portions 32 are reversed right and left may be aligned in a short direction of the compartment areas 18. That is, the positions of the pixel wall portions 32 may be reversed right and left in the compartment areas 18 adjacent to each other in the lateral direction. In this case, the positions of the pixel wall portions 32 may be at the same side in the compartment areas 18 adjacent to each other in the longitudinal direction.

Figure 5A:
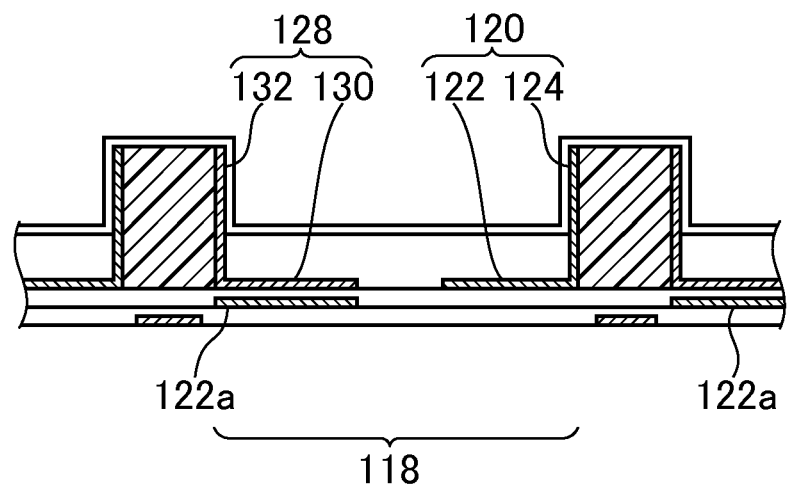
FIGS. 5A and 5B are cross-sectional views illustrating a structure of a modified example of the first embodiment.
Figure 5B:
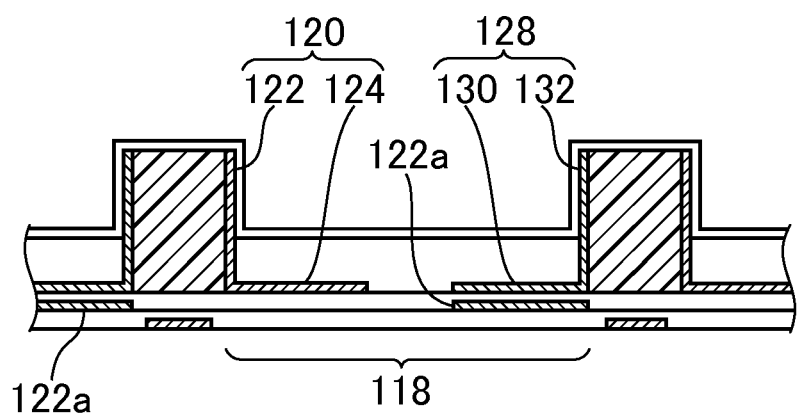

FIGS. 5A and 5B are cross-sectional views illustrating a structure according to a modified example of the first embodiment. In this example, since a pixel electrode 128 and a common electrode 120 are formed in the same layer, a common plane portion 122 extends from a common wall portion 124 so as not to overlap with a pixel plane portion 130. Similarly, in this example, an equipotential surface is formed centered on the pixel electrode 128, and an electric field distribution is asymmetric with respect to a center of the pixel with the result that the viewing angle characteristic is degraded. Under the circumstances, a compartment area 118 having a pixel wall portion 132 on a left side illustrated in FIG. 5A, and the compartment area 118 having the pixel wall portion 132 on a right side illustrated in FIG. 5B are arrayed adjacent to each other to improve the viewing angle characteristic.

A plurality of the common electrodes 120 each further includes a second common plane portion 122a. The second common plane portion 122a is electrically connected to the common plane portion 122. The second common plane portion 122a is located under the overall pixel plane portion 130 through a second interlayer insulating film 126. A retention capacity of a thin film transistor is formed by the pixel plane portion 130 and the second common plane portion 122a which overlap with each other through the second interlayer insulating film 126 so that the thin film transistor can stably operate.

Second Embodiment

Figure 6:
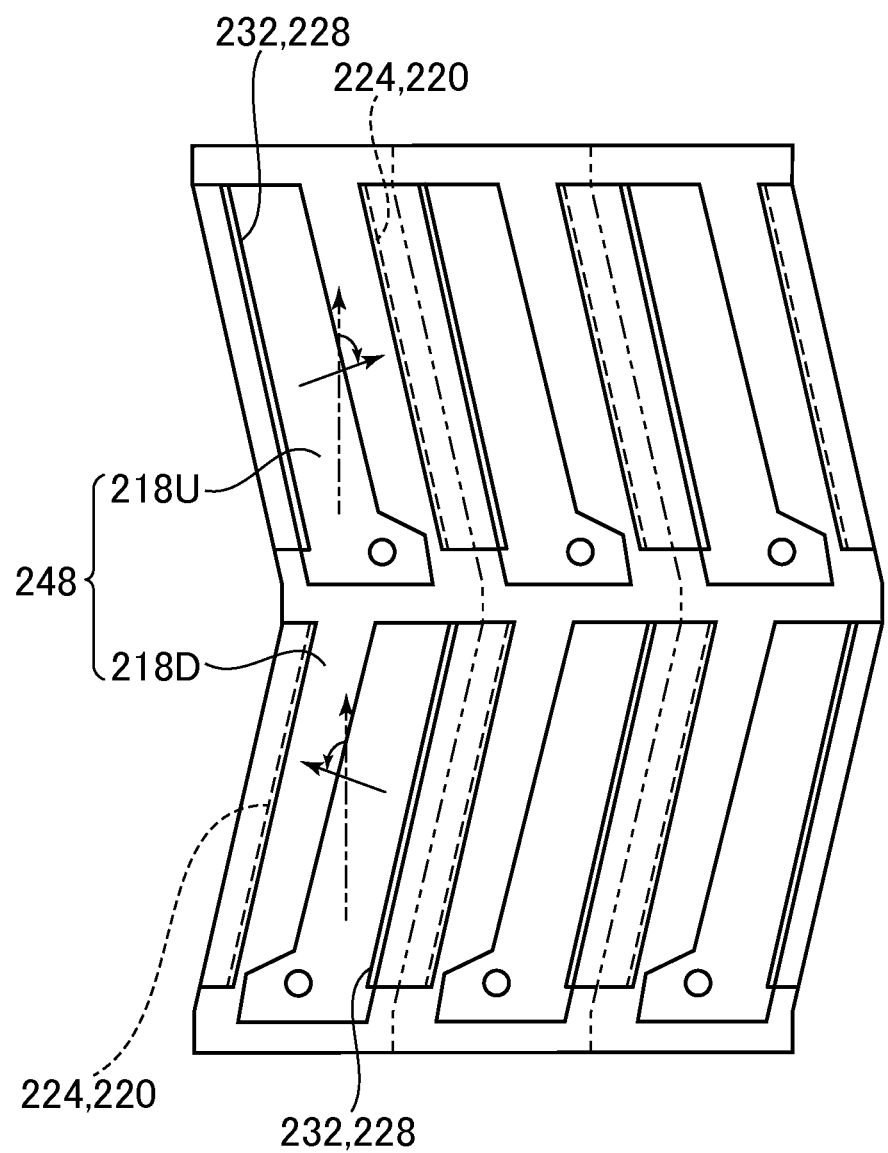
FIG. 6 is a cross-sectional view illustrating a liquid crystal display device according to a second embodiment of the invention.

FIG. 6 is a cross-sectional view illustrating a liquid crystal display device according to a second embodiment of the invention. The horizontal electric field switching system described in the first embodiment has a feature that the brightness is high. However, when pixels of white display are viewed obliquely, if an initial orientation direction is a direction of an azimuth 0°, hue is not neutral in the vicinity of a direction of 45° and in the vicinity of a direction of 135°. This is caused by a difference in the phase difference which is received by a light according to a viewing direction since an orientation state of liquid crystal molecules is different when the pixels of the white display are viewed in the direction of 45° and in the direction of 135°. Under the circumstances, in this embodiment, a multi-domain structure is combined with the features described in the first embodiment In detail, in this embodiment, pixel areas 248 are each configured by a pair of compartment areas 218U and 218D which are aligned in the longitudinal direction. A plurality of pixel electrodes 228 is arrayed so that wall surfaces of pixel wall portions 232 are extended to zigzag in the longitudinal direction. Also, a plurality of common electrodes 220 is arrayed so that wall surfaces of common wall portions 224 are extended to zigzag in the longitudinal direction. The liquid crystal molecules are initially oriented so that a long axis direction thereof becomes parallel to the longitudinal direction.

A facing direction of the pixel wall portions 232 and the common wall portions 224 which face each other is inclined in a first rotating direction (a direction along which the right side rises up) with respect to the lateral direction in one (compartment areas 218U on the upper side of FIG. 6) of a pair of compartment areas configuring the pixel areas 248. The pixel wall portions 232 are arranged on the left side, and the liquid crystal molecules are tilted up in an upper right direction.

A facing direction of the pixel wall portions 232 and the common wall portions 224 which face each other is inclined in a second rotating direction (a direction along which the left side rises up) opposite to the first rotating direction with respect to the lateral direction in the other (compartment areas 218D on the lower side of FIG. 6) of the pair of compartment areas configuring the pixel areas 248. The pixel wall portions 232 are arranged on the right side, and the liquid crystal molecules are tilted up in a left direction.

The compartment areas 218U on the upper side in which the liquid crystal molecules are twisted rightward, and tilted up in the right direction, and the compartment areas 218D on the lower side in which the liquid crystal molecules are twisted leftward, and tilted up in the left direction are combined together to configure the pixel areas 248. With the above configuration, not only the viewing angle characteristic of the transmittance, but also the viewing angle characteristic of the hue can be compensated.

Figure 7:
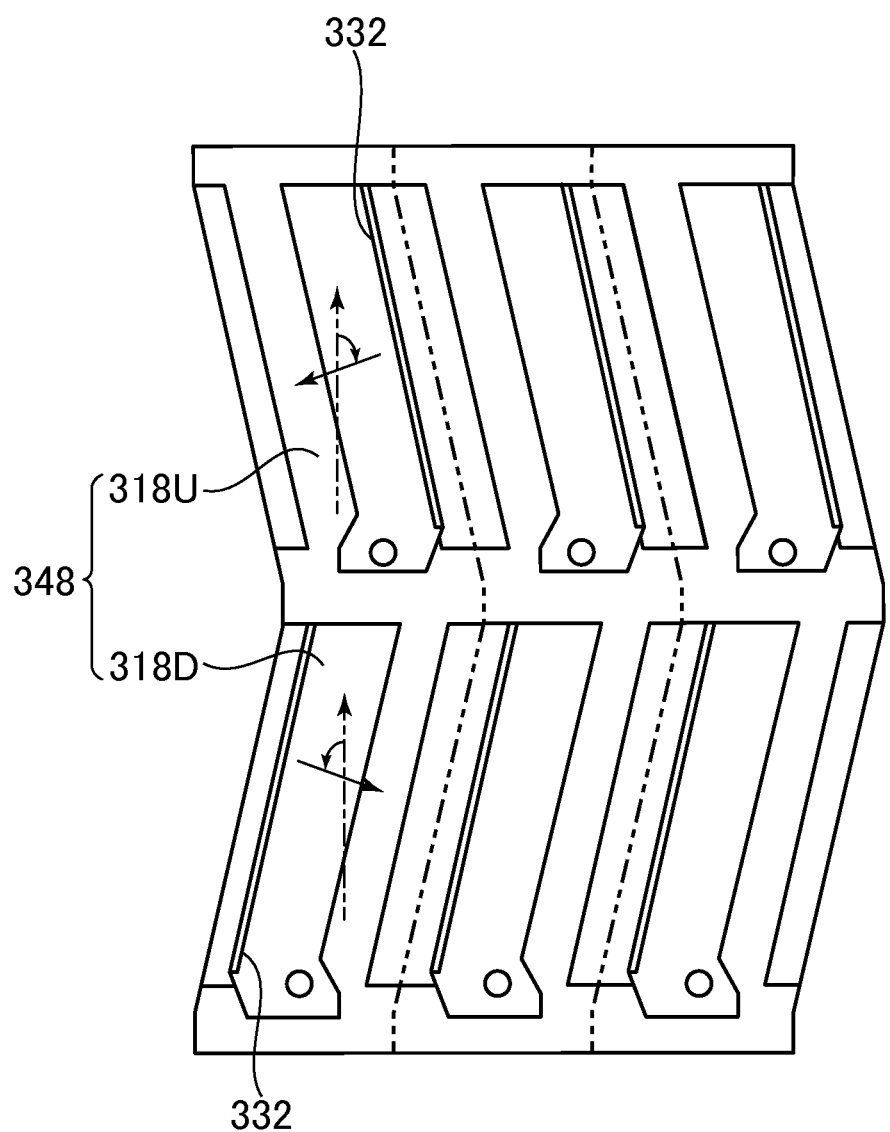
FIG. 7 is a diagram illustrating a modified example of the second embodiment.
Figure 8A:
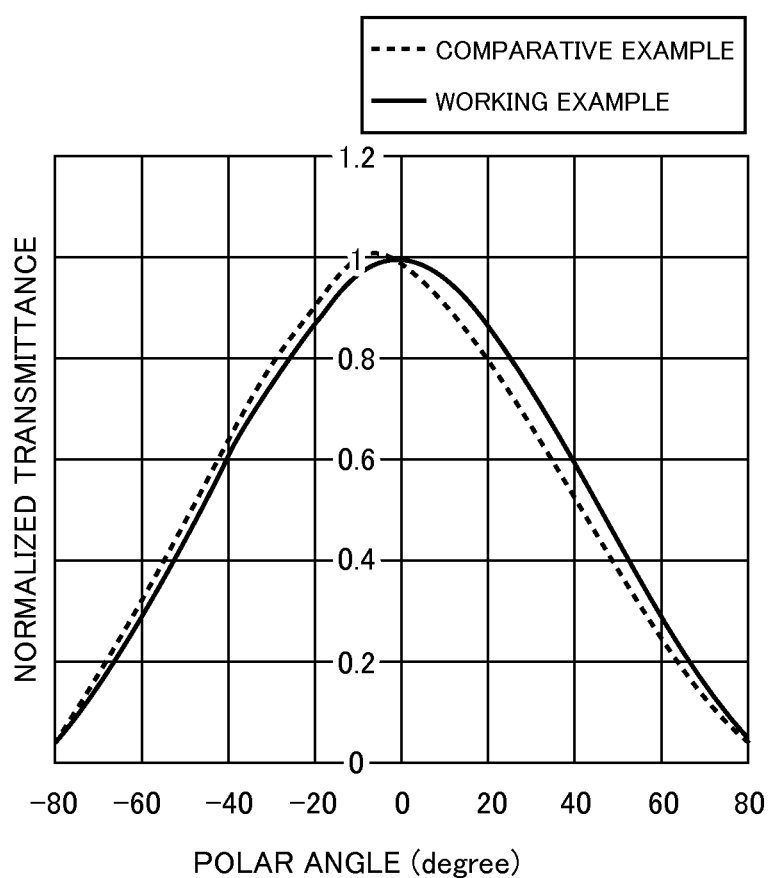
FIG. 8A is a diagram illustrating a polar angle dependency of a normalized transmittance of azimuths 0 to 180°.
Figure 8B:
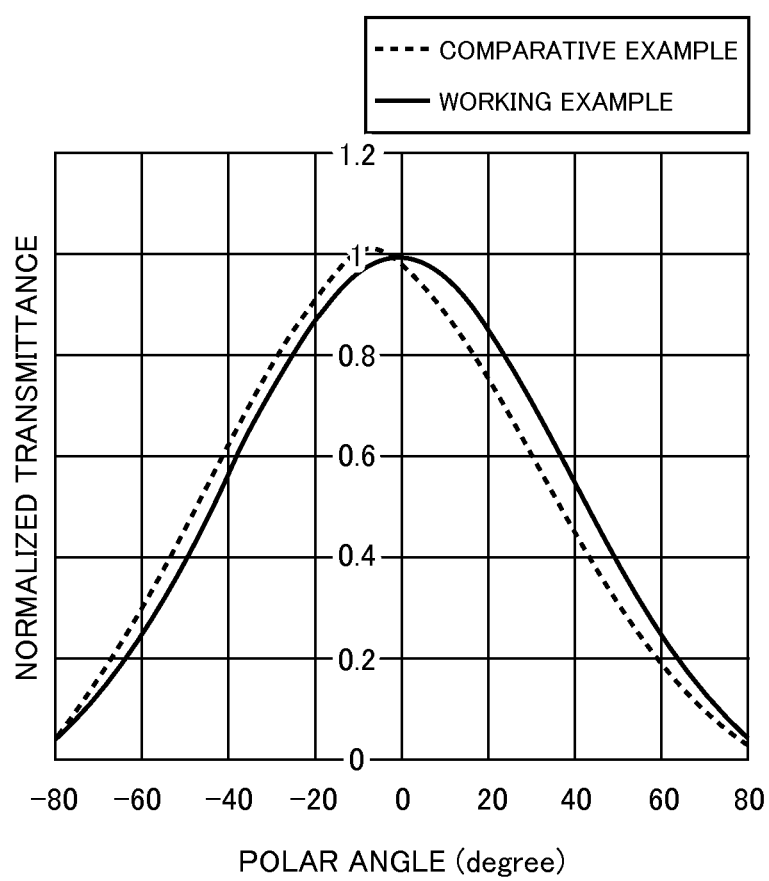
FIG. 8B is a diagram illustrating a polar angle dependency of the normalized transmittance of azimuths 30 to 210°.
Figure 8C:
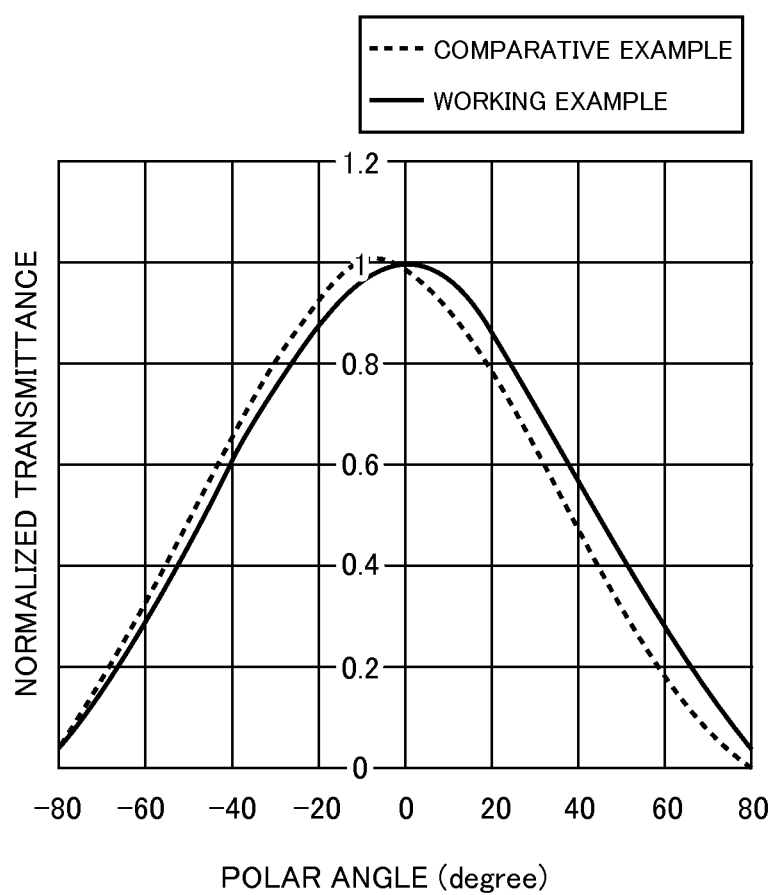
FIG. 8C is a diagram illustrating a polar angle dependency of the normalized transmittance of azimuths 60 to 240°.
Figure 8D:
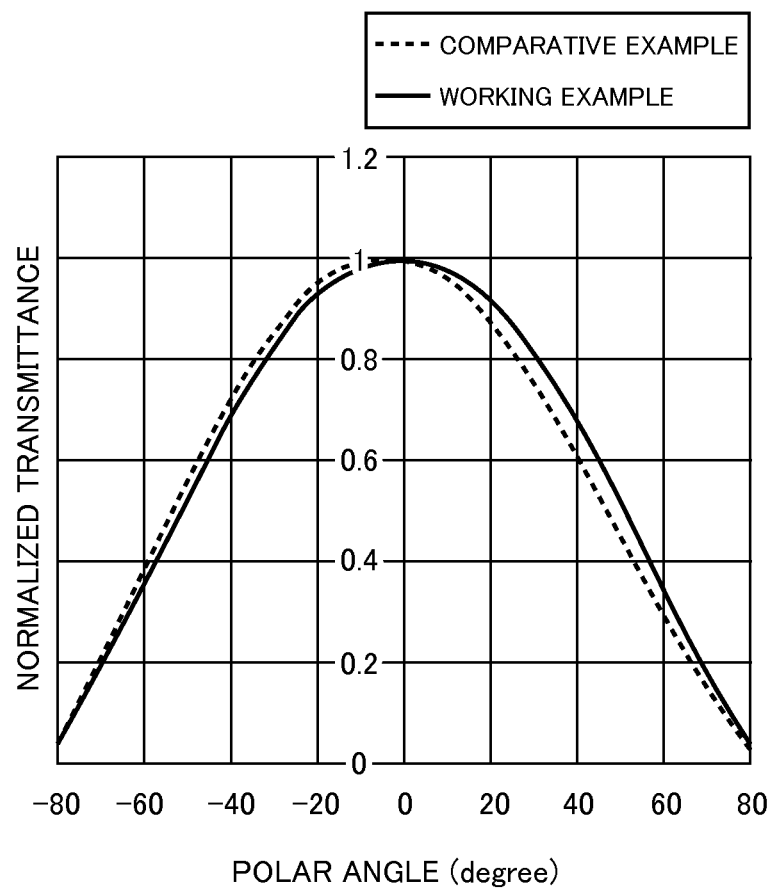
FIG. 8D is a diagram illustrating a polar angle dependency of the normalized transmittance of azimuths 90 to 270°.
Figure 9A:
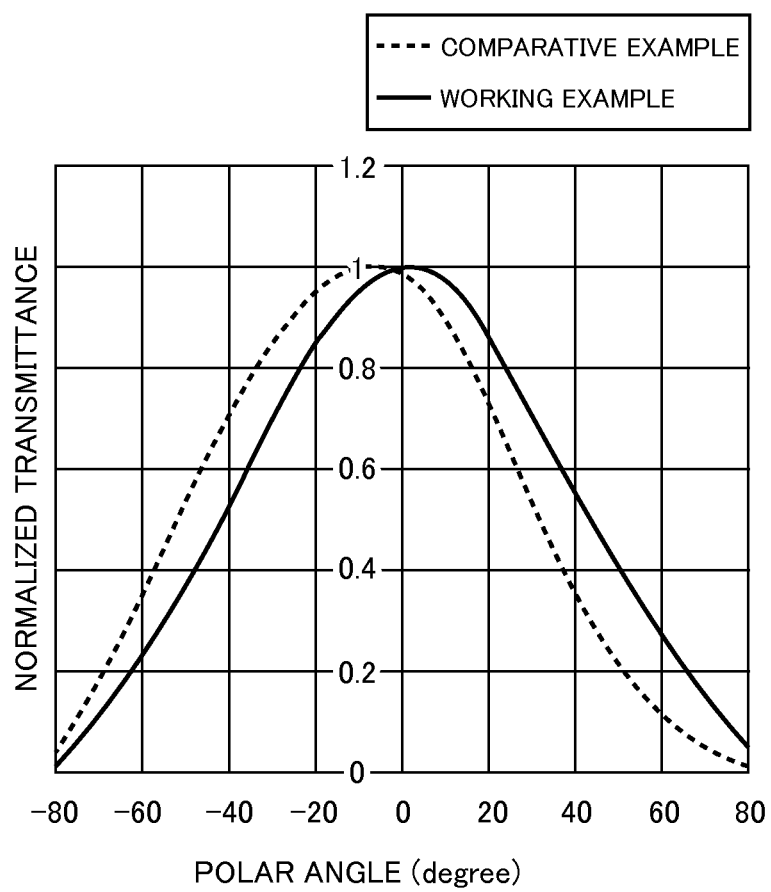
FIG. 9A is a diagram illustrating a polar angle dependency of the normalized transmittance of the azimuths 0 to 180°.
Figure 9B:
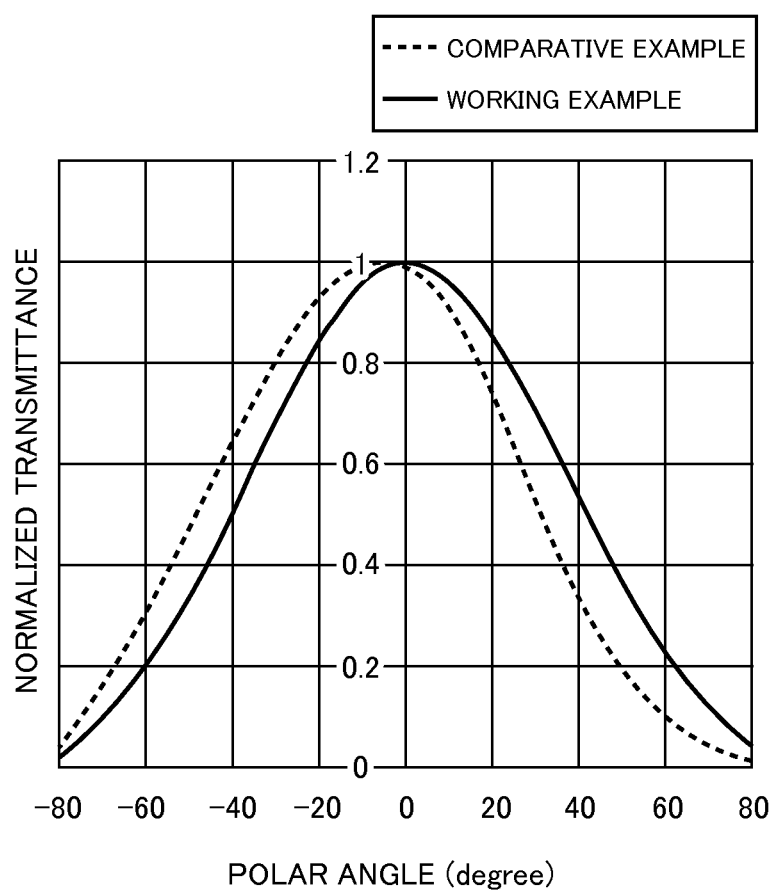
FIG. 9B is a diagram illustrating a polar angle dependency of the normalized transmittance of the azimuths 30 to 210°.
Figure 9C:
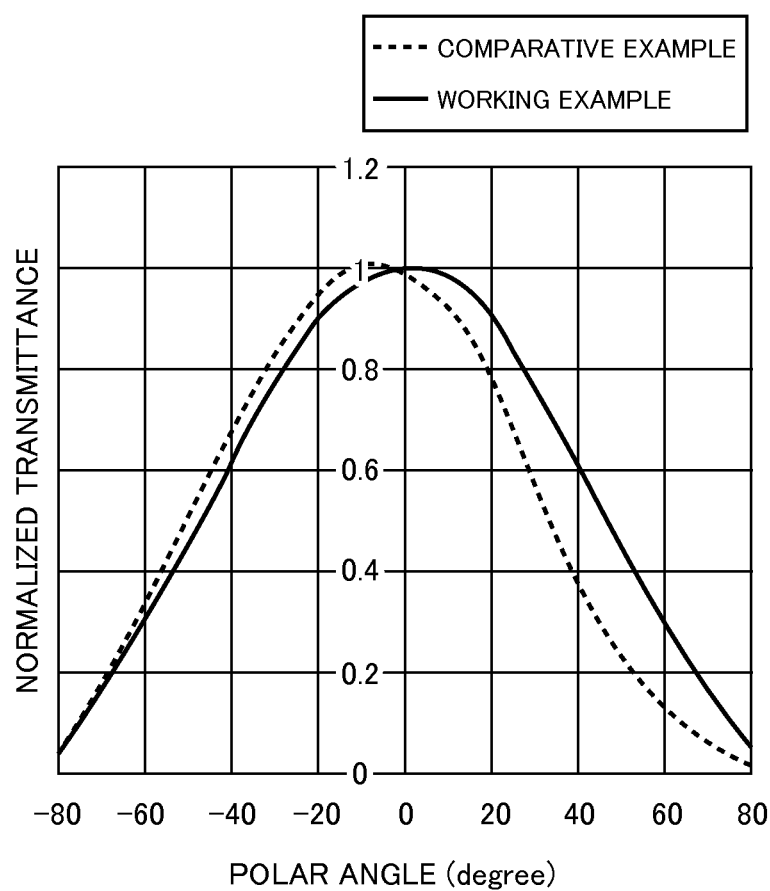
FIG. 9C is a diagram illustrating a polar angle dependency of the normalized transmittance of the azimuths 60 to 240°.
Figure 9D:
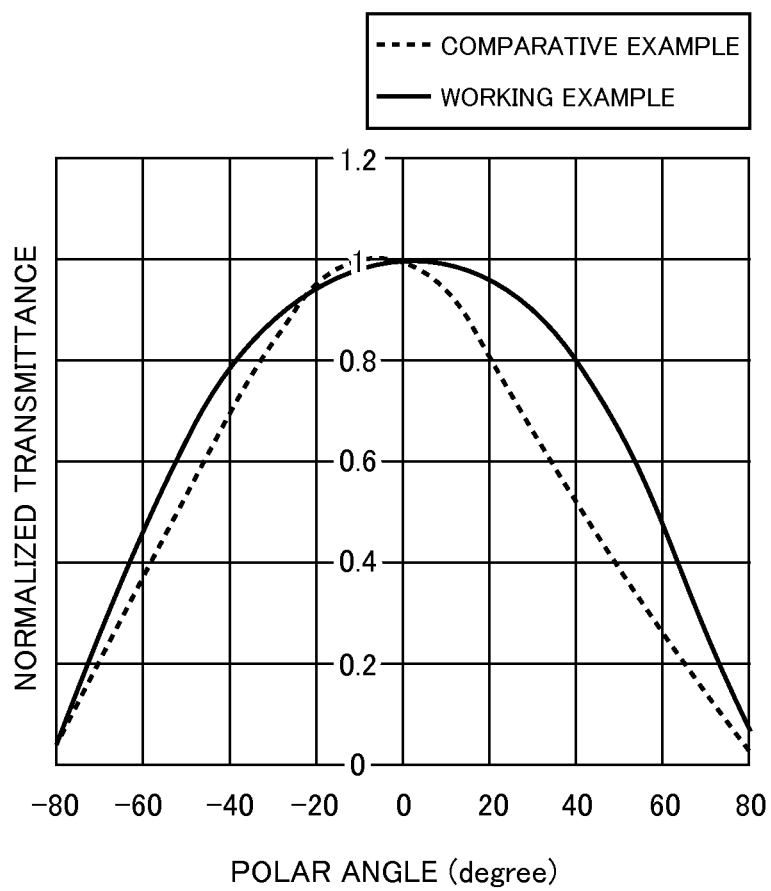
FIG. 9D is a diagram illustrating a polar angle dependency of the normalized transmittance of the azimuths 90 to 270°.

FIG. 7 is a diagram illustrating a modified example of the second embodiment. In the modified example, positions of pixel wall portions 332 are reversed with respect to those in the second embodiment. Therefore, compartment areas 318U on the upper side in which the liquid crystal molecules are twisted rightward, and tilted up in the left direction, and compartment areas 318D on the lower side in which the liquid crystal molecules are twisted leftward, and tilted up in the right direction are combined together to configure pixel areas 348.

EXAMPLES

Subsequently, experimental results of the liquid crystal display device according to the invention will be described. In the experiment, a voltage (Vmax) necessary to obtain a maximum transmittance in front of the screen is applied to measure a normalized value (normalized transmittance) which is the transmittance of the front of the screen.

An example (refer to FIG. 2) in which the sides on which the pixel wall portions 32 of the compartment areas 18 adjacent to each other are located are reversed right and left is compared with a comparative example (not shown) in which the pixel wall portions 32 of the compartment areas 18 adjacent to each other are located at the same side.

FIGS. 8A, 8B, 8C, and 8D illustrate respective polar angle dependencies of a normalized transmittance of azimuths 0 to 180°, azimuths 30 to 210°, azimuths 60 to 240°, and azimuths 90 to 270°. The polar angle dependency of the transmittance in the comparative example is most degraded in the azimuths of 0 (−180) to 90 (270) degrees.

It is confirmed from the measurement results that the normalized transmittance in the comparative example is asymmetric with respect to the polar angle of 0 degrees whereas the viewing angle characteristic in this example is symmetrical. Therefore, it is confirmed that the viewing angle characteristic of the pixels can be remarkably improved with the application of the invention.

FIGS. 9A to 9D illustrate other experimental results. In this experiment, the normalized transmittance in a halftone which is half of the maximum transmittance is measured. FIGS. 9A, 9B, 9C, and 9D illustrate respective polar angle dependencies of a normalized transmittance of azimuths 0 to 180°, azimuths 30 to 210°, azimuths 60 to 240°, and azimuths 90 to 270°. It is confirmed from this experimental results that in this example, the normalized transmittance in the halftone is symmetric with respect to the polar angle of 0 degrees, and the effects in the halftone is every large.

Subsequently, in order to not only improve the viewing angle characteristic of a panel, but also further improve the front brightness, an optimum length of the pixel plane portions 30 of the pixel electrodes 28 is studied. The reason why the length of the pixel plane portions 30 is optimized is because since an electric field intensity and a direction of the electric field are different between the pixel wall portions 32 side and the common wall portions 24 side as illustrated in FIG. 3, the length L1 of the pixel plane portions 30 of the pixel electrodes 28 at which a maximum transmittance is obtained is conceivably different from the length L2 of the common plane portions 22 of the common electrodes 20.

Figure 10:
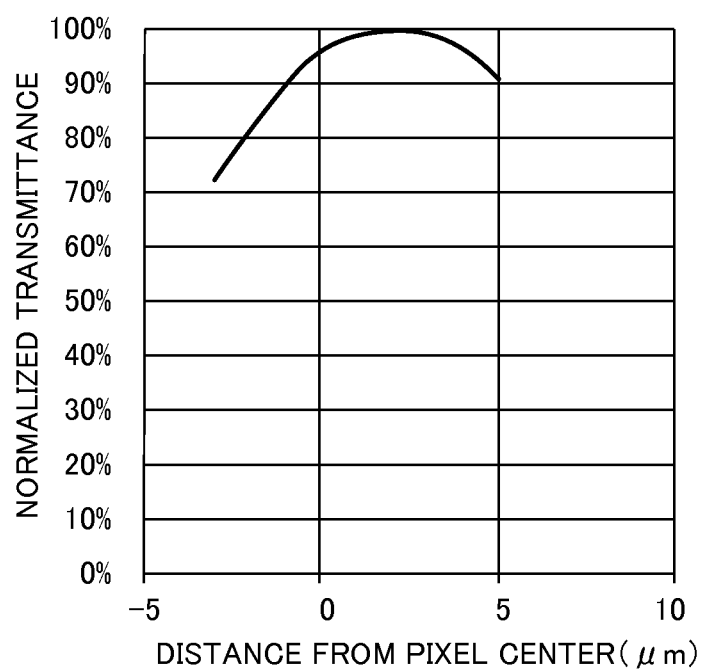
FIG. 10 is a diagram illustrating a relationship between a length L1 of a pixel plane portion illustrated in FIG. 3, and the normalized transmittance.

FIG. 10 illustrates a relationship between the length L1 of the pixel plane portion 30 illustrated in FIG. 3, and the normalized transmittance. The length L1 of the pixel plane portions 30 is expressed as "−" if the length L1 is shorter, and as "+" if the length L1 is longer, when a length from an edge of the walls 16 side to a center of the pixel is based as (0). The normalized transmittance represents a transmittance normalized by the transmittance at which the maximum transmittance is obtained.

It is found from the results shown in FIG. 10 that the higher transmittance is obtained when the length L1 of the pixel plane portions 30 of the pixel electrodes 28 is longer than the length of the pixel center (case of "+"). Therefore, it becomes apparent that the front brightness can be further improved by setting the length L1 of the pixel plane portions 30 of the pixel electrodes 28 to be longer than the length to the pixel center.

Also, when it is assumed that the normalized transmittance of the related art horizontal electric field switching system is about 88%, if the normalized transmittance in this example is equal to or higher than about 90%, the higher transmittance higher than that in the related art is obtained. Therefore, if the length L1 of the pixel plane portions 30 of the pixel electrodes 28 in this example is shorter by 1 μm, or longer by 5 μm from the distance to the pixel center, the higher transmittance than that in the related art horizontal electric field switching system is obtained. That is, when the distance from the edge on the walls 16 side of the pixel plane portions 30 to the pixel center is X (μm), the length L1 (μm) of the pixel plane portions 30 falls within the following expression.

$$X-1 \leq L1 \leq X+5$$

As a result, the high front brightness can be realized.

From the experimental results, it is preferable that the distance X from the edge of the pixel plane portions 30 on the side where the pixel wall portions 32 are disposed to the center of the compartment areas 18, a pixel width p from the pixel wall portions 32 in a direction of the common wall portions 24, and the length L1 extended from the edge of the pixel plane portions 30 toward the common wall portions 24 have the following relationship.

$$X-p \times (0.05) \leq L1 \leq X+p \times (0.25)$$

When the above-mentioned features are further applied to the above-mentioned embodiments, the brightness of the front of the screen can be improved while the viewing angle characteristic is improved.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
   a substrate having a plurality of compartment areas;
   a plurality of pixel electrodes disposed in the plurality of compartment areas of the substrate;
   a plurality of common electrodes disposed in the plurality of compartment areas of the substrate; and
   a liquid crystal material driven by an electric field generated between the plurality of pixel electrodes and the plurality of common electrodes,
   wherein the plurality of pixel electrodes each includes a pixel plane portion expanded along a surface of the substrate, and a pixel wall portion rising up from the pixel plane portion, and one of the pixel electrodes is arranged in each of the compartment areas, wherein the plurality of common electrodes each includes a common plane portion expanded along a surface of the substrate, and a common wall portion rising up from the common plane portion so as to face the pixel wall portion, and one of the common electrodes is arranged in each of the compartment areas, wherein the plurality of compartment areas is arrayed in a lateral direction and a longitudinal direction of the surface of the substrate;

wherein each of the compartment areas has the pixel wall portion on one of right and left sides in the lateral direction, and has the common wall portion on the other of the right and left sides in the lateral direction, wherein molecules of the liquid crystal material are tilted up from the pixel wall portions in a direction of the common wall portion by the electric field, and wherein the respective pixel wall portions of the adjacent compartment areas are positioned on opposite sides to each other in the lateral direction, wherein a distance X from an edge of the pixel plane portion on a side where the pixel wall portion is disposed to a center of the compartment area, a pixel width p from the pixel wall portion in a direction of the common wall portion, and a length L extending from the edge of the pixel plane portion toward the common wall portion have a relationship of $$X-p\times(0.05) \leq L \leq X+p\times(0.25).$$

2. The liquid crystal display device according to claim 1, wherein the common plane portion extends from the common wall portion so as to reach under the overall pixel plane portion through an insulating film.

3. The liquid crystal display device according to claim 1, wherein a facing direction of the pixel wall portion and the common wall portion which face each other is parallel to the lateral direction, and wherein the molecules of the liquid crystal material are oriented so that a long axis direction of the molecules is oblique to the longitudinal direction, and nonparallel to the lateral direction.

4. A liquid crystal display device, comprising:
a substrate having a plurality of compartment areas;
a plurality of pixel electrodes disposed in the plurality of compartment areas of the substrate;
a plurality of common electrodes disposed in the plurality of compartment areas of the substrate; and
a liquid crystal material driven by an electric field generated between the plurality of pixel electrodes and the plurality of common electrodes, wherein the plurality of pixel electrodes each includes a pixel plane portion expanded along a surface of the substrate, and a pixel wall portion rising up from the pixel plane portion, and one of the pixel electrodes is arranged in each of the compartment areas, wherein the plurality of common electrodes each includes a common plane portion expanded along a surface of the substrate, and a common wall portion rising up from the common plane portion so as to face the pixel wall portion, and one of the common electrodes is arranged in each of the compartment areas, wherein the plurality of compartment areas is arrayed in a lateral direction and a longitudinal direction of the surface of the substrate;

wherein each of the compartment areas has the pixel wall portion on one of right and left sides in the lateral direction, and has the common wall portion on the other of the right and left sides in the lateral direction, wherein molecules of the liquid crystal material are tilted up from the pixel wall portions in a direction of the common wall portion by the electric field, and wherein the respective pixel wall portions of the adjacent compartment areas are positioned on opposite sides to each other in the lateral direction, wherein the common plane portion extends from the common wall portion so as not to overlap with the pixel plane portion.

5. The liquid crystal display device according to claim 4, wherein the plurality of common electrodes each further includes a second common plane portion that is electrically connected to the common plane portion, and positioned under the overall pixel plane portion through an insulating film.

6. The liquid crystal display device according to claim 4, wherein a facing direction of the pixel wall portion and the common wall portion which face each other is parallel to the lateral direction, and wherein the molecules of the liquid crystal material are oriented so that a long axis direction of the molecules is oblique to the longitudinal direction, and nonparallel to the lateral direction.

7. A liquid crystal display device, comprising:
a substrate having a plurality of compartment areas;
a plurality of pixel electrodes disposed in the plurality of compartment areas of the substrate;
a plurality of common electrodes disposed in the plurality of compartment areas of the substrate; and
a liquid crystal material driven by an electric field generated between the plurality of pixel electrodes and the plurality of common electrodes, wherein the plurality of pixel electrodes each includes a pixel plane portion expanded along a surface of the substrate, and a pixel wall portion rising up from the pixel plane portion, and one of the pixel electrodes is arranged in each of the compartment areas, wherein the plurality of common electrodes each includes a common plane portion expanded along a surface of the substrate, and a common wall portion rising up from the common plane portion so as to face the pixel wall portion, and one of the common electrodes is arranged in each of the compartment areas, wherein the plurality of compartment areas is arrayed in a lateral direction and a longitudinal direction of the surface of the substrate;

wherein each of the compartment areas has the pixel wall portion on one of right and left sides in the lateral direction, and has the common wall portion on the other of the right and left sides in the lateral direction, wherein molecules of the liquid crystal material are tilted up from the pixel wall portions in a direction of the common wall portion by the electric field, and wherein the respective pixel wall portions of the adjacent compartment areas are positioned on opposite sides to each other in the lateral direction, wherein a pixel area is configured by a pair of the compartment areas aligned in the longitudinal direction, wherein in one of the pair of compartment areas configuring the pixel area, the facing direction of the pixel wall portion and the common wall portion which face each other is inclined in a first rotating direction with respect to the lateral direction, wherein in the other of the pair of compartment areas configuring the pixel area, the facing direction of the pixel wall portion and the common wall portion which face each other is inclined in a second rotating direction opposite to the first rotating direction with respect to the lateral direction, and wherein the molecules of the liquid crystal material are oriented so that a long axis direction of the molecules is parallel to the longitudinal direction.

8. The liquid crystal display device according to claim 7, wherein the plurality of pixel electrodes is arrayed so that wall surfaces of the pixel wall portions are extended to zigzag in the longitudinal direction, and wherein the plurality of common electrodes is arrayed so that wall surfaces of the common wall portions are extended to zigzag in the longitudinal direction.

9. The liquid crystal display device according to claim 7, wherein the common plane portion extends from the common wall portion so as to reach under the overall pixel plane portion through an insulating film.

\* \* \* \* \*